United States Patent Office 3,376,713
Patented Apr. 9, 1968

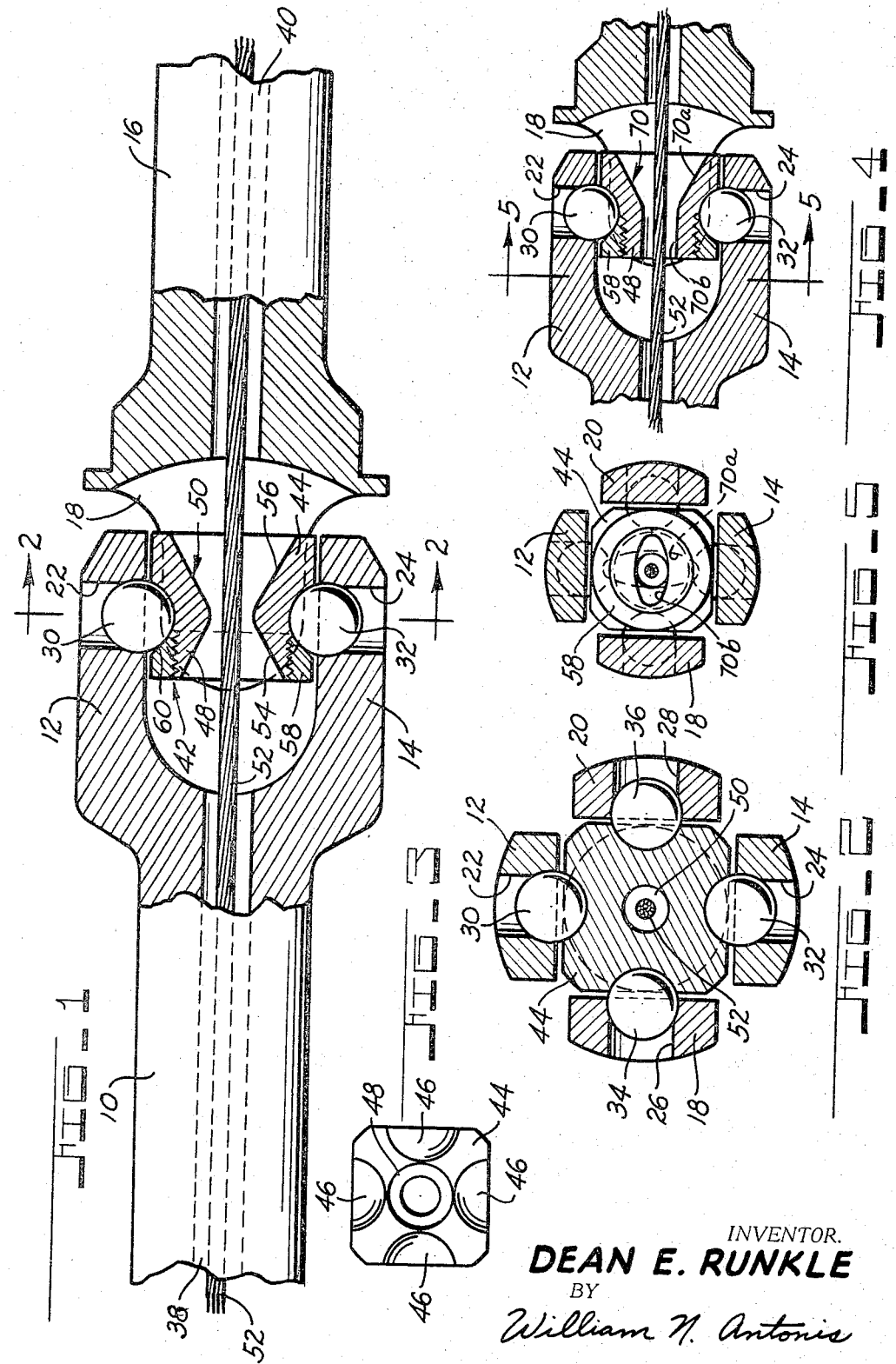

3,376,713
UNIVERSAL JOINT
Dean E. Runkle, South Bend, Ind., assignor to The Bendix Corporation, a corporation of Delaware
Filed Dec. 23, 1965, Ser. No. 515,993
6 Claims. (Cl. 64—17)

ABSTRACT OF THE DISCLOSURE

The following relates to a universal joint, particularly for use in a steering column, which includes an adjustable coupling mechanism located between the arms of two perpendicularly disposed forked members for eliminating lash between the forked members. The coupling mechanism, which includes an opening through the center thereof for permitting the passage of a control cable therethrough, is formed of a first hollow torque transmitting center retaining member and a second hollow center retaining member which is threaded on to the first retaining member so that rotation thereof will cause the retaining members to move towards each other and thereby preload the arms of the forked members.

---

This invention relates to universal joints and, more particularly, to improvements in a universal joint of the type disclosed in my Patent No. 3,217,516 and my copending application Ser. No. 424,431, now Patent No. 3,296,830. One of the objects of this invention is to provide a universal joint which can be inserted in a two-piece steering column so that the driver of a vehicle can adjust the steering wheel and column to any position which is deemed to be comfortable during operation of the vehicle.

Another object of this invention is to provide a universal joint wherein the desired preload can be adjusted and maintained for long life and durability.

A further object of this invention is to provide a universal joint which is adjustable for precise torque requirements and insures a method whereby the preload can be matched to the application.

A still further object of this invention is to provide a universal joint which is entirely free from back-lash.

An important object of this invention is to provide a universal joint of the type described which includes an opening through the center thereof for permitting the passage of a remote control cable which extends through the center of the steering column to a control located at the steering wheel.

More specifically, it is an object of this invention to provide, in a universal joint consisting of a pair of forked members which are positioned at right angles with respect to each other, an adjustable coupling mechanism which not only will permit the elimination of backlash, but which also will permit the passage of a remote control cable through its hollow center.

The above and other objects, features, and advantages of the invention will become apparent from the following description taken in connection with the accompanying drawing which forms a part of this invention and in which:

FIGURE 1 is a view partially in section of the universal joint;

FIGURE 2 is sectional view taken along line 2—2 of FIGURE 1;

FIGURE 3 is a plan view of one of the components of the coupling mechanism;

FIGURE 4 is a sectional view, similar to FIGURE 1, showing another embodiment of the universal joint; and FIGURE 5 is a sectional view taken along line 5—5 of FIGURE 4.

Referring to FIGURES 1-3, it will be noted that numeral 10 indicates a forked shaft member having a pair of arms 12 and 14 located at one end thereof and that numeral 16 indicates a second similar forked shaft member having a pair of arms 18 and 20 also located at one end thereof. Diametrically opposed bores 22 and 24 are located in arms 12 and 14, respectively, whereas diametrically opposed bores 26 and 28 are located in arms 18 and 20. It will be noted that the bores 22 and 24 of the one forked shaft are centered in the same plane with the bores 26 and 28 of the other forked shaft, but are located at right angles with respect thereto. Spherical balls 30, 32, 34, and 36 are press fit into and locked within the bores 22, 24, 26 and 28, respectively, as described in my copending application Ser. No. 424,431, now Patent No. 3,296,830. Axially extending passages 38 and 40 are located in the forked shaft members 10 and 16, respectively.

The adjustable coupling mechanism, indicated generally by the numeral 42, includes a square-shaped torque transmitting center retaining member 44 having separate and distinct seats or pockets 46 for receiving the spherical balls. Each of the ball seats is formed in the manner described and claimed in my copending application Ser. No. 424,431, now Patent No. 3,296,830. The center retaining member 44 also includes a shank or stud 48 extending therefrom which is threaded on its outer diameter, and a passage 50 extending therethrough which permits the passage of the remote control cable 52 extending through the passages 38 and 40 of the steering column. It will be noted that the passage 50 has outwardly flared end portions 54 and 56 so that the cable 52 will not bind when the shaft members 10 and 16 are angularly disposed. In FIGURE 1 it will be noted that this passage 50 takes the form of a substantially conical hourglass-shaped passage. A second hollow round center retaining member 58, which is a washer-like element, is threaded on its internal diameter for threaded engagement with the stud 48 extending from the other center retaining member 44. An annular surface 60 is formed on the center retaining member 58 for contacting the spherical balls. Although this annular surface is shown as being conical, it could also be spherical, provided the radius thereof is sufficiently greater than the radius of the spherical balls.

With this novel universal joint coupling arrangement, which permits the passage of a remote control cable therethrough, it will be seen that it is possible to achieve and control any desired preload level simply by adjusting, that is, by rotating the nut or washer-like center retaining member 58 with a suitable tool within a given torque range. Thus, if the member 58 is rotated or tightened, this will cause the center retaining members 44 and 58 to move toward each other. Such movement of these members will cause the arms 12, 14, 18 and 20, which in effect are cantilever beams, to become preloaded. This cantilever beam action of the universal joint arms will compensate for lash or wear over extended periods of operation and, through use of subsequent adjustments, if necessary, maintain a lash-free universal joint at all times regardless of operation, reverse direction, etc. The two center retaining members can be locked together by any suitable means, such as staking, or if no subsequent adjustments are desired, by welding.

In the embodiment shown in FIGURES 4 and 5, wherein like parts are identified by the same numerals, it will be seen that the strength of the torque transmitting center retaining member 44 has been increased by forming a passage 70 therein which removes less material than the conical hourglass-shaped passage of FIGURE 1. Since this passage 70 has one end 70a flared outwardly in substantially one plane, and the other end 70b flared outwardly in substantially another plane, said planes being perpendicular to one another, no binding of the cable will occur when the shafts 10 and 16 are angularly disposed.

The advantages and many applications of the universal joint which has the foregoing described features will be obvious to those skilled in the art. Furthermore, although this invention has been described in connection with certain specific embodiments, it will be obvious to those skilled in the art that various changes may be made in the form, structure, and arrangement of parts without departing from the spirit of the invention.

Accordingly, I do not desire to be limited to the specific embodiments disclosed herein primarily for purposes of illustration, but instead desire protection falling within the scope of the appended claims.

Having thus described the various features of the invention, what I claim as new and desire to secure by Letters Patent is:

1. A universal joint comprising two members capable of being rotated with their axes angularly disposed with respect to one another, a pair of spaced arms located at the end of each of said rotatable members, diametrically opposed spherical surfaces protruding from the arms of each of said rotatable members, said spherical surfaces of one of said members being centered in the same plane with the spherical surfaces of the other of said members but at right angles with respect thereto, and adjustable coupling means for joining said rotatable members, said coupling means including a first hollow torque transmitting center retaining member having separate and distinct seats for receiving said spherical surfaces, said first hollow center retaining member including a passage extending therethrough and having one end thereof flared outwardly in substantially one plane and the other end thereof flared outwardly in substantially another plane, said planes being perpendicular to one another, and a second hollow center retaining member operatively connected to said first center retaining member for causing movement of said center retaining members in a direction tending to preload said arms by moving said arms in an outward direction, said second center retaining member having an annular surface formed thereon for contacting said spherical surfaces.

2. A universal joint, as defined in claim 1, wherein said two rotatable members each include an axially extending passage therein substantially in alignment with the passage extending through said first center retaining member.

3. A universal joint comprising two members capable of being rotated with their axes angularly disposed with respect to one another, a pair of spaced arms located at the end of each of said rotatable members, diametrically opposed spherical surfaces protruding from the arms of each of said rotatable members, said spherical surfaces of one of said members being centered in the same plane with the spherical surfaces of the other of said members but at right angles with respect thereto, and adjustable coupling means for joining said rotatable members, said coupling means including a first hollow torque transmitting center retaining member having separate and distinct seats for receiving said spherical surfaces, and a second hollow center-retaining member operatively connected to said first center-retaining member for causing movement of said center-retaining members in a direction tending to preload said arms by moving said arms in an outward direction, said second center-retaining member having an annular surface formed thereon for contacting said spherical surfaces, said operative connection between said first and second hollow center-retaining members including means for causing movement of said retaining members towards each other upon rotation of one of said members with respect to the other of said members.

4. A universal joint, as defined in claim 3, wherein said means for causing movement of said center retaining members towards each other includes a threaded connection therebetween.

5. A universal joint, as defined in claim 3, wherein said second center retaining member is a non-torque transmitting member.

6. A universal joint, as defined in claim 5, wherein the annular surface on said second center retaining member is a conical surface.

References Cited

UNITED STATES PATENTS

| | | | |
|---|---|---|---|
| 1,897,945 | 2/1933 | Dooley | 64—17 |
| 2,545,646 | 3/1951 | Blinkman | 64—17 |
| 2,879,651 | 3/1959 | Leto et al. | 64—17 |
| 3,057,175 | 10/1962 | Folley | 64—17 |
| 3,107,506 | 10/1963 | Klomp | 64—17 |
| 3,217,516 | 11/1965 | Runkle | 64—17 |

FOREIGN PATENTS 1,200,466   6/1959   France.

HALL C. COE, *Primary Examiner.*